United States Patent Office 3,004,945
Patented Oct. 17, 1961

3,004,945
DIHYDRAZIDE-ISOCYANATE POLYMER AND SOLUTION THEREOF
John Farago, Wilmington, Del., assignor to E. I. du Pont de Nemours and Company, Wilmington, Del., a corporation of Delaware
No Drawing. Filed Dec. 5, 1958, Ser. No. 778,291
8 Claims. (Cl. 260—30.8)

This invention relates to new and useful synthetic polymers. More particularly, it relates to a novel class of high molecular weight nitrogen-containing condensation polymers which may be formed into useful shaped structures.

Reactions of isocyanates with compounds containing active hydrogen atoms have been recognized for many years. These reactions may be characterized generally by the equation:

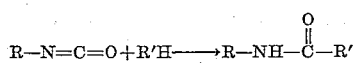

wherein R represents an organic radical and R'H represents a compound which has an active hydrogen and which generally comprises an organic compound having a reactive center of which the active hydrogen is a part. Thus, many types of active hydrogen compounds may be reacted with isocyanates to form products predictable from the above equation. Further, it has long been recognized that the reaction between bi-functional compounds, whose reactive centers are mutually compatible and capable of combination, may theoretically lead to the formation of polymeric substances. Inasmuch as the isocyanate grouping is reactive to many types of reagents, much work has been reported involving reactions of this type. Many of the polymers so formed have not had properties which were suitable for the formation of shaped structures therefrom. Frequently, they have been of low molecular weight and of limited stability.

It is an object of this invention to produce a novel class of high molecular weight nitrogen-containing polymers. It is a further object of this invention to produce a novel class of polymers which is capable of being formed into shaped structures. It is a still further object of this invention to provide a novel class of nitrogen-containing film- and fiber-forming polymers, incorporating as recurring units within the polymeric chain a new and unique grouping of atoms.

In accordance with this invention, there is provided a novel synthetic, linear polymeric composition, formed from diisocyanates and dihydrazides, which comprises recurring structural units of the formula:

wherein R represents a divalent organic radical of the aliphatic, aromatic, cycloaliphatic, or aliphatic-aromatic type which is derived from a diisocyanate, or a mixture of such radicals; and R' is a divalent organic radical derived from a dibasic carbon-containing acid, or a mixture of radicals, which may be characterized by one of the following structural units:

(a)

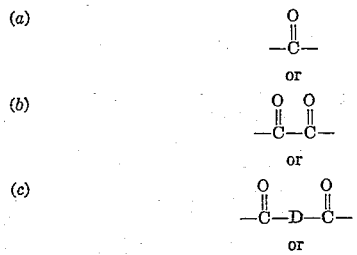

or (b)

or (c)

or (d) 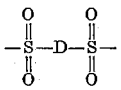

wherein D is a divalent organic radical of the aliphatic, aromatic, or aliphatic-aromatic type. For film- and fiber-forming characteristics, a polymer having an inherent viscosity of at least about 0.2 is preferred.

The polymers of this invention may be prepared by solution polymerization. In accordance with this technique, the reactants are dissolved in a solvent, which also serves as a solvent for the resulting polymer. The solution thus prepared is stirred for a period of time ranging up to several hours at a temperature from about room temperature to about 100° C. During this time, the viscosity of the solution increases, indicating the formation of a polymeric substance. The recovery and purification of the polymer may be effected in accordance with generally recognized techniques. As solvents for the polymerization reaction, dimethylsulfoxide, dimethylformamide, N,N - dimethylacetamide, N - methylpyrrolidone, tetramethylene sulfone, hexamethylphosphoramide, and other similar compounds are suitable.

The diisocyanates which are of utility in this invention may be aliphatic diisocyanates, as ethylene diisocyanate, propylene diisocyanate, tetramethylene diisocyanate, pentamethylene diisocyanate, hexamethylene diisocyanate, and other higher members of this homologous series. Branched-chain aliphatic diisocyanates, as 3-methylhexane-1,6-diisocyanate or 3,3' - dimethylpentane-1,5-diisocyanate, may also be used in the preparation of the polymers of this invention. The cycloaliphatic diisocyanates as, e.g., 1,4-cyclohexane diisocyanate, may be employed. Among the aromatic diisocyanates which are of utility in this invention, the following are exemplary: m-phenylene diisocyanate, p-phenylene diisocyanate, and those which contain more than one aromatic nucleus as, for example, 4,4'-biphenylene diisocyanate, methylene bis(4-phenyl isocyanate), 3,3'-dimethyl-4,4'-biphenylene diisocyanate, and 3,3'-dimethoxy-4,4'-biphenylene diisocyanate.

The dihydrazides which may be used in this invention may be derived from aliphatic diacids, as, e.g., carbonyl dihydrazide, oxalyl dihydrazide, malonyl dihydrazide, succinyl dihydrazide, glutaryl dihydrazide, adipyl dihydrazide and other higher members of this series. Isophthaloyl dihydrazide, terephthaloyl dihydrazide, and dihydrazides derived from other aromatic carboxylic acids, as, for example, from naphthalenedicarboxylic acid or biphenyldicarboxylic acids, may also be used in the preparation of the polymers of this invention. Sulfonic acids of the same types as the carboxylic acids listed above may also be of utility in the preparation of these polymers. Such sulfonic acid derivatives as m-benzene bissulfonhydrazide, p-benzene bissulfonhydrazide, and hexamethylene-1,6-bissulfonhydrazide may be listed as exemplary.

Inherent viscosity may be defined by the following formula:

$$n_{inh} = \frac{1 n n_{rel}}{c}$$

The $n_{rel}$ (relative viscosity) may be determined by dividing the flow time in a capillary viscometer of a dilute solution of the polymer by the flow time for the pure solvent. The concentration (c) is generally 0.5 gram of polymer per 100 ml. of solution, and the measurements are made at a temperature of 30° C.

*Example I*

To a solution of 1.94 grams of isophthaloyl dihydrazide in 50 ml. of dimethylsulfoxide are added at room temperature 2.50 grams of methylene bis(4-phenylisocyanate). The reaction mixture warms spontaneously, and immediately becomes viscous. Stirring at room temperature under nitrogen is continued for 2 hours. The polymer is isolated by pouring the solution into 300 grams of water, followed by filtration. The resulting solid is washed twice with water. It is dried in a vacuum oven at a temperature of 100° C. for 15 hours; the product dissolves in dimethylsulfoxide, and has an inherent viscosity, as measured in that solvent, of 1.18. The polymer has a melt temperature of 250° C., and is soluble in cold N-methylpyrrolidone, sulfuric acid, dimethylsulfoxide, and dimethylformamide and in hot hexamethylphosphoramide. A 20% solution in dimethylsulfoxide is prepared from the oven-dried sample and a tough, clear film is cast. A viscous solution is prepared by dissolving 39 grams of polymer in 150 ml. of dimethylformamide. This solution may be easily dry-spun, yielding a fiber which can be stretched 3-fold at about 100° C. This fiber exhibits a tenacity of 3.7 g.p.d., an elongation of 31%, a modulus of 42 g.p.d. and an inherent viscosity of 0.98 (as measured in dimethylsulfoxide).

*Example II*

Isophthaloyl dihydrazide, in the amount of 1.94 grams, is dissolved in 40 ml. of dimethylsulfoxide. To this solution are added 1.74 grams of tolylene-2,4-diisocyanate. Upon addition of the diisocyanate, the solution becomes viscous. Stirring under nitrogen at room temperature is continued for 2 hours, at which time the solution is poured into water to precipitate the polymer. The product is removed by filtration, washed with water, and dried in a vacuum oven at a temperature of 100° C. The polymer exhibits a melt temperature of 230° C., and is soluble in dimethylsulfoxide.

*Example III*

To a solution of 1.94 grams of isophthaloyl dihydrazide in 50 ml. of dimethylsulfoxide are added 2.96 grams of 3,3'-dimethoxy-4,4'-biphenylene diisocyanate. The resulting suspension is warmed to effect solution of all of the diisocyanate. A clear, viscous solution, which does not change in consistency on standing over-night, is formed. The polymer is isolated by pouring the solution into water, and removing the solid product by filtration. This product is washed with water and dried in air, after which it exhibits a polymer melt temperature of 230° C. A 20% solution in dimethylsulfoxide is prepared from the solid polymer and cast to a clear film.

*Example IV*

To a solution of 1.94 grams of isophthaloyl dihydrazide in 50 ml. of dimethylsulfoxide are added at room temperature with stirring under nitrogen 2.64 grams of 3,3'-dimethyl-4,4'-biphenylene diisocyanate. The solution almost immediately becomes viscous and an exothermic reaction takes place. Stirring is continued for one hour at which time a film may be cast from the solution. This film is dried at 100° C. in a forced-draft oven for 1 hour and soaked in water over-night to remove residual solvent. The resulting film is clear and tough. The remaining portion of the solution is precipitated by pouring into water. The polymer is removed by filtration, washed, and dried; it exhibits a polymer melt temperature of 260° C. The inherent viscosity of the air-dried sample, as measured in dimethylsulfoxide, is 1.32.

*Example V*

To a solution of 1.94 grams of isophthaloyl dihydrazide in 50 ml. of dimethylsulfoxide are added, at room temperature, 1.68 grams of hexamethylene diisocyanate. The reaction mixture is stirred under nitrogen at room temperature for 18 hours. The polymer is precipitated by pouring the solution into water, and the solid product is removed by filtration, washed, and dried. The polymer is soluble in dimethylsulfoxide, and has a polymer melt temperature of 220° C.

*Example VI*

Oxalyl dihydrazide, in the amount of 1.18 grams, is dissolved in 25 ml. of dimethylsulfoxide by heating to a temperature of about 100° C. This solution is added to a solution of 2.50 grams of methylene bis(4-phenyl isocyanate) in 15 ml. of dimethylsulfoxide. The mixture becomes quite viscous and is cast on a glass plate and dried in a forced-draft oven at a temperature of 100° C. The film thus formed is clear and very tough. It exhibits a polymer melt temperature of about 270° C. and can be oriented by stretching 2.5 times over a hot surface. The polymer is soluble in dimethylformamide.

*Example VII*

A solution of 1.18 grams of oxalyl dihydrazide in 40 ml. of dimethylsulfoxide is prepared by heating to a temperature of about 100° C. This solution is then added to a solution of 1.74 grams of tolylene-2,4-diisocyanate in 15 ml. of dimethylsulfoxide. Stirring of the solution is continued for 2 hours at room temperature during which time the viscosity does not appreciably increase. A clear film can be cast from a portion of the solution. The remaining portion is precipitated in 200 ml. of water. The solid polymer is separated by filtration, washed with water and methanol, and dried. The product exhibits a polymer melt temperature of 290° C.

*Example VIII*

To 30 ml. of dimethylsulfoxide are added 1.18 grams of oxalyl dihydrazide, and the mixture is warmed to effect solution. This solution is added to a solution of 2.64 grams of 3,3'-dimethylbiphenylene diisocyanate, which had previously been sublimed, in 20 ml. of dimethylsulfoxide. The reaction mixture is stirred at room temperature for 1 hour, after which a film is cast from a portion of the solution, the remaining portion being precipitated in 300 ml. of water. The precipitated polymer was separated by filtration, washed, and dried. It exhibits a polymer melt temperature of 300° C., with some decomposition.

*Example IX*

A solution of 2.36 grams of oxalyl dihydrazide in 50 ml. of dimethylsulfoxide at a temperature of 100° C. is added to 3.36 grams of hexamethylene diisocyanate. The solution become moderately viscous after standing for 3 to 4 hours at a temperature of 60° C. Upon standing for 60 hours at room temperature, the solution can be cast to a clear, tough film. The polymer is soluble in formic acid and in dimethylsulfoxide and melts at 216° C.

*Example X*

Terephthaloyl dihydrazide, in the amount of 1.94 grams, is suspended in 50 ml. of dimethylsulfoxide. To this suspension is added at room temperature 2.50 grams of methylene bis(4-phenyl isocyanate). The reaction mixture warms spontaneously and is appreciably clarified. Upon pouring into water, the polymer is precipitated. while stirring under nitrogen is continued, solution is complete. The solution is cooled to room temperature, remaining clear and stable, but becoming quite viscous. Upon pouring into water, the polymer is precipitated Following washing and drying, it exhibits a polymer melt temperature of 240° C., and is soluble in dimethylsulfoxide.

*Example XI*

Carbohydrazide, in the amount of 0.90 gram are dissolved in 68 ml. of dimethylsulfoxide, and to this solution are added 2.50 grams of methylene bis(4-phenyl isocyanate), forming a 5% solution. After stirring the reaction mixture for 1½ hours under nitrogen at room temperature, the polymer is precipitated with water, washed, and dried. The resulting product is soluble in dimethylsulfoxide, and has a polymer melt temperature of 260° C.

*Example XII*

Carbohydrazide, in the amount of 0.90 gram, is dissolved in 70.8 ml. of dimethylsulfoxide, and to this solution are added 2.64 grams of 3,3'-dimethyl-4,4'-biphenylyl diisocyanate to form a 5% solution. On addition of the diisocyanate, the solution becomes very viscous and at the end of 1½ hours reaction time, is almost gel-like. The polymer is isolated by pouring the solution into water, filtering, washing, and drying. The product is slightly soluble in dimethylsulfoxide, in which an inherent viscosity of 1.46 is measured, and has a polymer melt temperature of 280° C.

*Example XIII*

To a solution of 1.33 grams of m-benzene bissulfonhydrazide in 25 ml. of dimethylsulfoxide are added 0.87 gram of tolylene-2,4-diisocyanate. The resulting solution is stirred for 2 hours under nitrogen at room temperature, and stirring is continued at a temperature of 60° for an additional two hours. The solution does not become viscous. Upon allowing to stand for a period of two days at room temperature, a film can be cast from the solution. The film is clear and glassy.

*Example XIV*

A solution of 1.33 grams of m-benzene bis-sulfonhydrazide in 30 ml. of dimethylsulfoxide is prepared. To this solution are added 1.32 grams of 3,3'-dimethyl-4,4'-biphenylyl diisocyanate, and the solution is stirred for a period of 8 hours at room temperature and is then allowed to stand for a period of two days at room temperature. The polymer is isolated by pouring the solution into water, and removing the solid product by filtration. It is washed with methanol, water and methanol, and dried in air. A polymer melt temperature of 280° C. is observed.

The polymers of this invention are useful in the preparation of shaped structures of various kinds. Their value in such applications is enhanced by the toughness and clarity which they generally exhibit. Films and filaments formed from these polymers are of particular utility. They are generally of high tenacity and high crystallinity and are stable and resistant to degradation. These properties make the films and fibers especially valuable in numerous end-use applications. Fibers formed from these polymers of diisocyanates and dihydrazides are more readily drawable than others and may be utilized in generally recognized applications for filamentary products, i.e., yarns, cords, fabrics, etc. The films formed from polymers of this invention may be used for a variety of protective and covering purposes.

I claim:

1. Novel synthetic, linear polymeric composition comprising recurring structural units of the formula:

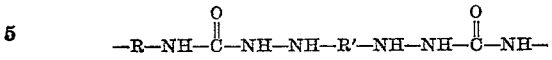

wherein R is a divalent organic radical selected from the group consisting of aliphatic, aromatic, cycloaliphatic, and aliphatic-aromatic and R' is a divalent organic radical selected from the group consisting of

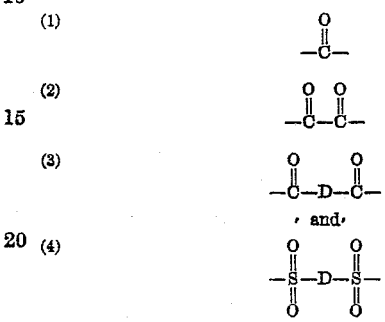

wherein D is a divalent organic radical selected from the group consisting of aliphatic, aromatic, or aliphatic-aromatic, said composition having an inherent viscosity of at least about 0.2.

2. A shaped article comprising the polymeric composition of claim 1.

3. A fiber comprising the polymeric composition of claim 1.

4. A film comprising the polymeric composition of claim 1.

5. A spinning solution comprising the polymeric composition of claim 1 in dimethylsulfoxide.

6. The process for preparing a novel synthetic, linear polymeric composition having an inherent viscosity of at least about 0.2 comprising reacting a diisocyanate, selected from the group consisting of aliphatic, aromatic, and cycloaliphatic diisocyanates, and a dihydrazide derived from a diacid selected from the group consisting of an aliphatic diacid, an aromatic carboxylic diacid and a sulfonic diacid, said reaction taking place at a temperature of from about room temperature to about 100° C. in a solvent for the reactants.

7. The process of claim 6 wherein the solvent is dimethylsulfoxide.

8. A spinning solution comprising the polymeric composition of claim 1 in a suitable organic solvent.

References Cited in the file of this patent

FOREIGN PATENTS 1,112,409   France ---------------- Mar. 14, 1956